(12) United States Patent
Brückner et al.

(10) Patent No.: US 9,593,844 B2
(45) Date of Patent: Mar. 14, 2017

(54) METHOD FOR OPERATING A WASTE HEAT STEAM GENERATOR

(75) Inventors: Jan Brückner, Uttenreuth (DE); Frank Thomas, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 957 days.

(21) Appl. No.: 13/128,657

(22) PCT Filed: Oct. 29, 2009

(86) PCT No.: PCT/EP2009/064263
§ 371 (c)(1),
(2), (4) Date: May 11, 2011

(87) PCT Pub. No.: WO2010/054934
PCT Pub. Date: May 20, 2010

(65) Prior Publication Data
US 2011/0225972 A1    Sep. 22, 2011

(30) Foreign Application Priority Data

Nov. 13, 2008  (EP) .................................. 08019862

(51) Int. Cl.
*F01K 13/00*    (2006.01)
*F22B 35/00*    (2006.01)
(Continued)

(52) U.S. Cl.
CPC ............ *F22B 35/007* (2013.01); *F01K 13/02* (2013.01); *F01K 23/101* (2013.01); *Y02E 20/16* (2013.01)

(58) Field of Classification Search
CPC ...... F01K 13/02; F01K 23/101; F22B 35/007; Y02E 20/16
(Continued)

(56) References Cited

U.S. PATENT DOCUMENTS 3,053,049 A  *  9/1962  Blaskowski  .......... F01K 23/103
                                                     122/479.4
3,293,963 A      12/1966  Carroll et al.
(Continued)

FOREIGN PATENT DOCUMENTS

CN         1109957 A       10/1995
EP       1 059 488 A2      12/2000
(Continued)

OTHER PUBLICATIONS

Dolezal R, "Die Speisewasser-bzw. Sattdampfumleitung als Mittel zur Korrektur der Heizflächenleistung bei GuD-Abhitzekesseln mit Trommel", VGB Kraftwerkstechnik GmbH Essen, DE, XP000522569; Magazine; 1995; DE, pp. 685-688.

*Primary Examiner* — Thomas Denion
*Assistant Examiner* — Kelsey Stanek

(57) ABSTRACT

A method for operating a waste heat steam generator including an evaporator, an economizer having a number of economizer heating surfaces, and a bypass line connected on the flow medium side in parallel with a number of economizer heating surfaces is provided. The method makes possible higher operational safety and reliability in the control of the waste heat steam generator. For this purpose, a parameter that is characteristic of the thermal energy fed to the waste heat steam generator is used to control or regulate the flow rate of the by-pass line.

12 Claims, 2 Drawing Sheets

(51) Int. Cl.
*F01K 13/02* (2006.01)
*F01K 23/10* (2006.01)

(58) Field of Classification Search
USPC .............................. 60/39.182, 39.5, 693, 645
See application file for complete search history.

(56) References Cited

U.S. PATENT DOCUMENTS

| | | | | |
|---|---|---|---|---|
| 3,818,872 | A | * | 6/1974 | Clayton et al. ............. 122/406.4 |
| 4,091,514 | A | | 5/1978 | Motes-Conners et al. |
| 5,394,776 | A | | 3/1995 | Robinson |
| 5,423,272 | A | * | 6/1995 | Dunn et al. ................... 110/347 |
| 5,555,849 | A | * | 9/1996 | Wiechard et al. ............ 122/4 D |
| 5,596,878 | A | * | 1/1997 | Hanson .............. B60H 1/00007 62/160 |
| 8,186,142 | B2 | * | 5/2012 | Narayan et al. ........... 60/39.182 |
| 2002/0083903 | A1 | * | 7/2002 | Liebig ........................... 122/1 R |
| 2004/0025510 | A1 | * | 2/2004 | Schwarzott ..................... 60/772 |
| 2006/0010893 | A1 | * | 1/2006 | Dominguez ............. F24F 3/06 62/201 |

FOREIGN PATENT DOCUMENTS

| | | | |
|---|---|---|---|
| EP | 1 241 323 | A1 | 9/2002 |
| EP | 1 429 074 | A1 | 6/2004 |
| EP | 2 034 137 | A1 | 3/2009 |
| GB | 2430399 | A | 3/2007 |
| JP | 1046501 | A | 2/1989 |
| JP | S6446501 | * | 2/1989 |
| JP | S6446501 | A * | 2/1989 |
| JP | 2075802 | A | 3/1990 |
| JP | H0275802 | * | 3/1990 |
| JP | H0275802 | A * | 3/1990 |
| JP | H0275802 | A * | 3/1990 |
| JP | 6159603 | A | 6/1994 |
| JP | H06159603 | * | 6/1994 |
| JP | H10292902 | | 11/1998 |

* cited by examiner

METHOD FOR OPERATING A WASTE HEAT STEAM GENERATOR

CROSS REFERENCE TO RELATED APPLICATIONS

This application is the U.S. National Stage of International Application No. PCT/EP2009/064263, filed Oct. 29, 2009 and claims the benefit thereof. The International Application claims the benefits of European Patent Office application No. 08019862.5 EP filed Nov. 13, 2008. All of the applications are incorporated by reference herein in their entirety.

FIELD OF INVENTION

The invention relates to a method for operating a waste heat steam generator having an evaporator, having an economizer with a number of economizer heating surfaces, and having a bypass line connected in parallel with a number of economizer heating surfaces on the flow medium side.

BACKGROUND OF INVENTION

A waste heat steam generator is a heat exchanger which recovers heat from a hot gas flow. Waste heat steam generators are deployed for example in gas and steam turbine power stations in which the hot exhaust gases of one or more gas turbines are conducted into a waste heat steam generator. The steam generated therein is subsequently used to drive a steam turbine. This combination produces electrical energy much more efficiently than a gas or steam turbine on its own.

Waste heat steam generators can be categorized according to a multiplicity of criteria: Based on the flow direction of the gas flow, waste heat steam generators can be classified into vertical and horizontal design types, for example. There are also steam generators having a plurality of pressure stages in which the water-steam mixture contained therein is characterized by a different thermal state in each case.

Generally, steam generators may be implemented as gravity circulation, forced circulation or once-through (continuous) steam generators. In a once-through steam generator, evaporator tubes are heated, resulting in complete evaporation of the flow medium in the evaporator tubes in a single pass. Following its evaporation, the flow medium—typically water—is fed to superheater tubes connected downstream of the evaporator tubes, where it is superheated. The position of the evaporation endpoint, i.e. the point of transition from a flow having residual wetness to a pure steam flow, is in this case variable and operating-mode-dependent. During full-load operation of a once-through steam generator of said type the evaporation endpoint is located for example in an end region of the evaporator tubes, such that the superheating of the evaporated flow medium commences already in the evaporator tubes.

In contrast to a gravity circulation or forced circulation steam generator, a once-through steam generator is not subject to any pressure limiting, which means that it can be dimensioned for live steam pressures far in excess of the critical pressure of water ($p_{Cri}$≈bar)—at which water and steam cannot occur simultaneously at any temperature and consequently also no phase separation is possible.

In order to increase the efficiency of the waste heat steam generator, the latter typically includes a feedwater preheater or economizer. This consists of a plurality of economizer heating surfaces which form the final heating surfaces in the flue gas path following a number of evaporator, superheater and reheater heating surfaces. On the flow medium side, the economizer is connected upstream of the evaporator heating surfaces and superheater heating surfaces and uses the residual heat in the exhaust gases to preheat the feedwater. Disposing the said arrangement in the flue gas duct results in the flue gas flowing through the economizer at relatively low temperatures.

During the operation of a waste heat steam generator it is imperative to ensure adequate supercooling of the flow medium at the evaporator inlet (i.e. the temperature of the flow medium should exhibit a sufficient deviation from the saturation temperature). This guarantees on the one hand that only a single-phase flow medium is present in the distribution system of the evaporator and consequently that no phase separation processes of water and steam can occur at the inlets of individual evaporator tubes; on the other hand the presence of a water-steam mixture at the evaporator inlet would make it difficult if not impossible to achieve an optimal control or regulation of the evaporator outlet enthalpy, as a result of which it might no longer be possible in certain situations to control the evaporator outlet temperatures.

For this reason a waste heat steam generator is typically configured in such a way that adequate supercooling is present at the evaporator inlet at full load. However, the supercooling at the evaporator on the medium side can vary to a greater or lesser degree due to physical conditions, especially in the case of transient load processes.

Additional measures are necessary in the lower load range to ensure adequate supercooling is present in spite of these fluctuations. For this purpose a subflow of the flow medium is typically diverted in a bypass line via a corresponding arrangement around one or more economizer heating surfaces and then mixed with the main flow again for example at the inlet of the last economizer. As a result of such a partial redirection of the flow medium past the flue gas duct the overall thermal absorption of the feedwater in the economizer heating surfaces is reduced and it is thereby ensured that adequate supercooling of the flow medium at the evaporator inlet can be achieved even in the lower load range.

In present-day systems the subflow through the economizer bypass line in the corresponding load range is generally set specifically such that a supercooling of e.g. at least 3 K is maintained at the evaporator inlet during stationary operation. For this purpose there is provided at the evaporator inlet a temperature and pressure measuring means with the aid of which the actual supercooling can be determined at any time instant via a difference calculation. A setpoint-actual comparison causes a valve in the economizer bypass line to be actuated if the minimum supercooling limit is undershot. Said valve receives an opening pulse of e.g. 1 s. A new valve position in which the valve then remains for e.g. 30 s is directly linked with said opening pulse via the valve actuating time. In the event that the required minimum supercooling level is still not reached even after said 30 s, the same process is repeated until either the minimum supercooling level is reached or exceeded or else the valve is fully open.

If, in the inverse case, the measured supercooling is for example greater than 6 K, the valve receives a closing pulse of e.g. 1 s. In comparison with the opening, the valve generally remains in the new position for a greater period of time (for example 600 s) before, following a new alignment between setpoint and actual value, the same process is repeated, should the supercooling at the evaporator inlet be still greater than 6 K and the valve not yet fully closed. In this case comparatively large time intervals are selected between the individual actuating pulses in order to avoid steam formation in the economizer.

As has become apparent, however, in particular in the case of rapid reductions in load, such as occur repeatedly in today's gas and steam installations, it is difficult or even impossible under certain conditions for the above-described control concept to guarantee the required minimum supercooling of the fluid at the evaporator inlet. In the event of said rapid load variations, steam formation at the evaporator inlet could consequently not be ruled out, with the result that problems may occur during the distribution to the individual evaporator tubes and under certain conditions it would no longer be possible to regulate the evaporator outlet temperature.

SUMMARY OF INVENTION

The object underlying the invention is therefore to disclose a method for operating a waste heat steam generator of the aforementioned type as well as a waste heat steam generator which enable a higher level of operational safety and reliability in the control of the waste heat steam generator.

According to the invention this object is achieved in relation to the method in that a variable that is characteristic of the thermal energy supplied to the waste heat steam generator is used to control or regulate the flow rate through the bypass line.

In this regard the invention is based on the consideration that a higher level of operational safety and reliability in the control of the waste heat steam generator would be possible if the formation of a water-steam mixture at the inlet of the evaporator could be reliably avoided under all load conditions. In this case the risk of steam formation is comparatively great in particular in the event of rapid changes in load, since here a comparatively rapid change in the supercooling at the inlet of the evaporator is present. In these cases the means of regulating the supercooling provided in the prior art, namely influencing the economizer bypass flow rate, responds too slowly. A faster responding control or regulation means should therefore be provided.

It became apparent here that the response time of the typical prior art control concept results in particular from the use of the supercooling, i.e. the difference between the temperature at the evaporator inlet and the saturation temperature in the evaporator, as the input variable for the control function. This means that the control for the flow rate through the economizer bypass line intervenes only when a change in the supercooling at the evaporator inlet has already taken place. An improvement would therefore be possible if a characteristic variable preceding in time in the manner of predictive control or regulation could be used.

Based on the knowledge that a change in the supercooling at the evaporator inlet is caused by the change in the thermal energy supplied to the waste heat steam generator, this can be achieved by using a variable that is characteristic of said thermal energy supplied to the waste heat steam generator for the purpose of controlling or regulating the flow rate through the bypass line.

In an advantageous embodiment, the flow rate through the bypass line is reduced if the characteristic variable is increased. This enables the flow rate through the bypass line to be adjusted accordingly already when the thermal energy supplied to the waste heat steam generator is increased and therefore even before the measurement of an actual change in the temperature or, as the case may be, supercooling at the inlet of the evaporator. If, namely, the thermal flow volume supplied to the waste heat steam generator is increased in the current mode of operation of the waste heat steam generator, this is linked to an increase in magnitude of further thermodynamic (state) variables of the flow medium (such as feedwater mass flow, pressure, medium temperatures, for example), which is directly associated with an increase in the inlet supercooling due to physical principles. In this case, therefore, the flow rate through the bypass line is reduced, thereby causing the temperature at the outlet of the economizer to increase and thus reducing the supercooling at the evaporator inlet.

In the corresponding inverse case, if the characteristic variable is reduced, the flow rate through the bypass line is advantageously increased in order thereby to adjust the outlet temperature of the economizer in a targeted manner.

Predictively controlling or regulating the flow rate through the bypass line of the economizer in this way, such that the flow rate is adjusted already before a change in the temperature at the inlet of the evaporator is actually measured, is predicated on a real, reliable characteristic variable for the thermal energy supplied to the waste heat steam generator. In an advantageous embodiment, the power output of a gas turbine connected upstream of the waste heat steam generator on the flue gas side is used as the characteristic variable for the thermal energy supplied to the waste heat steam generator. In gas and steam turbine power plants, the flue gas is namely generated by such a gas turbine disposed upstream of the waste heat steam generator and the temperature or, as the case may be, volume of said flue gas varies with the instantaneous power output of the gas turbine. The power output of the upstream gas turbine is therefore characteristic of the thermal flow volume supplied to the waste heat steam generator and can furthermore be forwarded as an easy-to-read signal to a corresponding control device. Accordingly, a particularly simple control or regulation of the flow rate through the economizer bypass line is possible.

In waste heat steam generators it is frequently the case that not all heating surfaces of the economizer are provided with a bypass line, but instead the bypass line runs for example parallel to a number of economizer heating surfaces and the mixing point of bypass line and flow through said economizer heating surfaces is followed by one or more further economizer heating surfaces. The previously used temperature signal for regulating the flow rate through the bypass line is measured at the outlet of the last economizer heating surface and hence at the inlet of the evaporator. Accordingly, said signal, which measures the temperature difference caused by changes in the flow rate through the bypass line, is delayed firstly by the time that the flow medium needs to flow through the last economizer heating surfaces that are not provided with a bypass line, and secondly also by processes for storing thermal energy in the tube walls of said heating surfaces, the thermal capacity of which is likewise to be taken into account. A further improvement in the control or regulation speed could therefore be achieved if the temperature at the mixing point at the outlet of the bypass line is advantageously used for controlling or regulating the flow rate through the bypass line. It is therefore possible to provide an even more reliable and faster control or regulation and prevention of steam formation at the inlet of the evaporator.

In addition to temperature fluctuations at the outlet of the economizer, the evaporator inlet supercooling is also significantly affected by fluctuations in the saturation temperature in the evaporator. Since the saturation temperature in the evaporator is substantially influenced by the pressure in the tube system, a strong decline in the inlet supercooling can occur e.g. in the event of rapid changes in system pressure (when a throttle reserve is dissipated, for example). In this case this change in the inlet supercooling is independent of the thermal energy supplied to the waste heat steam generator. In order also to take into account a scenario such as this, the saturation temperature in the evaporator should advantageously be used for controlling or regulating the flow rate through the bypass line. This enables a further improvement in the quality of control for the economizer bypass line to be realized in the case of a rapid change in pressure in the evaporator.

Furthermore, an even better quality of control in respect of the flow rate through the bypass line can be achieved if an even better variable that is characteristic of the thermal energy supplied to the waste heat steam generator is used for the control or regulation function. This is because under certain conditions the power output of an upstream gas turbine cannot guarantee an acceptable quality because this signal possibly does not correlate sufficiently with the thermal flow volume introduced into the waste heat steam generator; on the other hand this signal is not available in applications without an upstream gas turbine.

For this reason in an advantageous embodiment the balanced flue gas heat of the evaporator should be used as a characteristic variable for the thermal energy supplied to the waste heat steam generator. The balanced flue gas heat is essentially determined from the mass flow of the flue gas on the one hand and the temperature difference at the inlet on the flue gas side and at the outlet of the evaporator on the other. In this case the inlet temperature is measured and the outlet temperature approximated by means of the saturation temperature of the evaporator. In practice this allows a direct measurement of the heat flow introduced into the evaporator—and consequently into the waste heat steam generator. Furthermore, this signal is often already present in control devices for waste heat steam generators, since it can be used for feedwater regulation. Through the use of this signal the quality of control or regulation can be further improved and adequate supercooling at the inlet of the evaporator assured with even greater reliability.

In relation to the waste heat steam generator the object is achieved by means of a waste heat steam generator having an evaporator, having an economizer with a number of economizer heating surfaces, having a bypass line connected in parallel with a number of economizer heating surfaces on the flow medium side and having a flow control or flow regulator valve, having a temperature and pressure measuring device, such as a temperature sensor and a pressure sensor, at the evaporator inlet, and if necessary a temperature measuring device at the mixing point at the outlet of the bypass line and a control device, such as a computer processor, that is connected to the aforementioned measuring devices and the flow control or flow regulator valve on the data side and is embodied for performing the said method.

A waste heat steam generator of this kind is advantageously deployed in a gas and steam turbine system.

The advantages associated with the invention consist in particular in that through the use of a variable that is characteristic of the thermal energy supplied to the waste heat steam generator for controlling or regulating the flow rate through the bypass line of the economizer of a waste heat steam generator, predictable and safe operation can be assured by means of the reliable setting of the supercooling at the evaporator inlet. Furthermore, excessive temperature fluctuations at the evaporator outlet are avoided, which is accompanied by further advantages for example with regard to the thick-walled components of the water-steam separator connected downstream of the evaporator. The method is therefore suitable in particular for modern gas and steam turbine power plants in which rapid load changes are frequently necessary.

BRIEF DESCRIPTION OF THE DRAWINGS

The invention is explained in more detail with reference to a drawing, in which.

Like parts are labeled with the same reference signs in both figures.

DETAILED DESCRIPTION OF INVENTION

Figure 1:
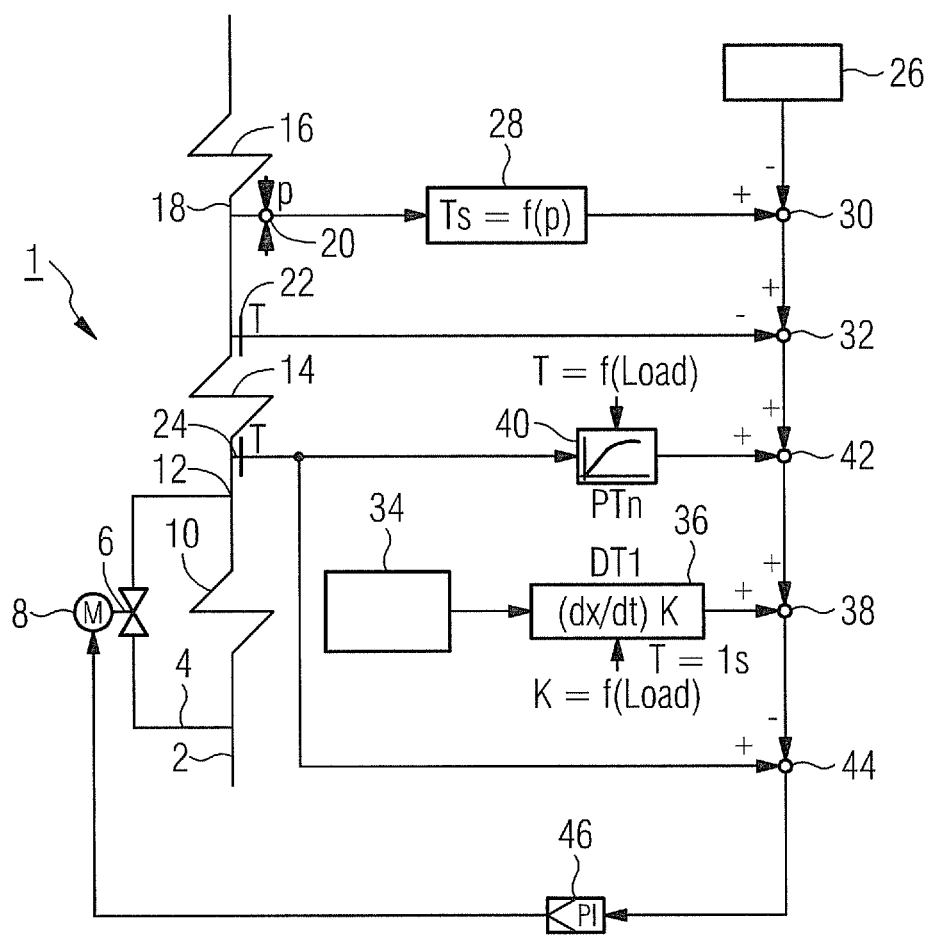
FIG. 1 is a schematic representation of the control method taking into account the power output of a gas turbine connected upstream of the waste heat steam generator.

FIG. 1 firstly shows in schematic form selected components of a waste heat steam generator 1. Flow medium, driven by means of a pump (not shown), flows into the circuit initially at the inlet 2, a bypass line 4 initially branching off. In order to regulate the flow through the bypass line, a flow regulator valve 6 is provided which is controllable by means of a motor 8. A simple control valve may also be provided, although a better adjustment of the supercooling at the evaporator inlet is possible by means of a rapidly responding regulator valve.

A part of the flow medium consequently flows into the bypass line 4 as a function of the position of the flow regulator valve 6, while another part flows into a first economizer heating surface 10. Further economizer heating surfaces can also be provided in parallel with the bypass line 4. At the outlet of the economizer heating surface 10 the flow medium from the bypass line 4 and the flow medium from the economizer heating surface 10 are mixed at a mixing point 12.

A further economizer heating surface 14 is connected downstream of the mixing point 12. After the flow medium has passed the economizer heating surface 14 it enters the downstream evaporator 16 at the evaporator inlet 18. Further components, such as e.g. a water-steam separating device, and further superheater heating surfaces are connected downstream of the evaporator 16, which can likewise consist of a number of heating surfaces.

Different arrangements of the economizer heating surfaces 10, 14 and the evaporator 16 are possible on the flue gas side. Generally, however, the economizer heating surfaces 10, 14 are disposed downstream of the evaporator 16 on the flue gas side, since the economizers are intended to conduct the coldest flow medium comparatively and to utilize the residual heat in the flue gas duct. In order to ensure problem-free operation of the waste heat steam generator 1, adequate supercooling, i.e. a sufficient difference between current temperature and saturation temperature in the evaporator, should be present at the evaporator inlet 18, such that only fluid flow medium is present. Only in this way can it be ensured that the flow medium is reliably distributed to the individual evaporator tubes in the evaporator 16.

In order to regulate the supercooling at the evaporator inlet 18, a pressure measuring device 20 and a temperature measuring device 22 are provided at this point. A further, more rapidly responding temperature signal which is not delayed by the time taken by the flow medium to pass through the economizer heating surface 14 is provided by a further temperature measuring device 24 at the mixing point 12.

On the regulation side, a supercooling setpoint value 26 is initially specified at the evaporator inlet 18. This value can be, for example, 3 K, i.e. the temperature at the evaporator inlet 18 is to be 3 K below the saturation temperature in the evaporator 16.

For this purpose the saturation temperature 28 in the evaporator 16 is initially determined from the pressure measured at the pressure measuring device 20, since said saturation temperature 28 is a direct function of the pressure prevailing in the evaporator 16. Said saturation temperature 28 is then added to the negative supercooling setpoint value 26 in an adding element 30. The temperature at the evaporator inlet 18 measured at the temperature measuring device 22 is thereupon subtracted in a further adding element 32. As result this now yields a suitable control value for controlling the flow regulator valve 6.

In the event of rapid changes to the thermal flow volume supplied to the waste heat steam generator 1, the regulation of the flow rate through the bypass line 4 may be effected too slowly under certain conditions, with the result that adequate supercooling at the evaporator inlet 18 is no longer guaranteed. In order to enable predictive regulation, the power output 34 of the gas turbine connected upstream of the waste heat steam generator 1 is therefore used as the input signal. The power output 34 serves as an input signal for a DT1 element 36 which generates a correspondingly scaled output signal in the event of changes in the power output 34. Said output signal is added to the setpoint value in a further adding element 38 for the measured deviation of the supercooling at the evaporator inlet. This enables an appropriate response to be made already at the start of a load ramp of the gas turbine and an actuating pulse for the flow regulator valve 6 can be generated (there is no need to wait for a measured undershooting or overshooting of the minimum supercooling limit first). Depending on the configuration of the components involved, it is thus possible to ensure adequate minimum supercooling at the evaporator inlet 18 with the aid of this additional pilot control signal even when rapid changes in load occur.

Although the desired minimum supercooling at the evaporator inlet 18 can probably be assured in most cases by means of this additional measure, corresponding fluctuations in the evaporator inlet supercooling must be expected due to the slow time response of the control function, which delay has a disadvantageous effect on the feedwater flow regulation and therefore leads to more or less extreme temperature fluctuations at the evaporator outlet.

A remedy is provided here by the additional temperature measuring device 24 after the mixing point 12. If the subflow through the bypass line 4 varies due to a control intervention, the changes in the temperature of the flow medium occurring as a result are registered already at the mixing point 12, i.e. before the flow medium enters the further economizer heating surface 14, which in the case of just one temperature measuring device 22 at the evaporator inlet 18 or outlet of the economizer heating surface 14 could only happen with a corresponding time delay as a result of the time taken by the flow medium to flow through the economizer heating surface 14. This measurement information is added to the negative control value in an adding element 44.

It nonetheless remains to bear in mind that the time delay response of the economizer heating surface 14 must be taken into account so that already executed control operations (triggered by the change in the flow regulation temperature at the inlet of the economizer heating surface 14) are not followed by a further control intervention (after arrival of the change in temperature at the outlet of the economizer heating surface 14). For this purpose the temperature signal of the temperature measuring device 24 is processed after the addition in a PTn element 40 which simulates the time delay response of the economizer heating surface 14. The output signal obtained is added to the previous control value in a further adding element 42 and thus compensates for any duplication.

The thus determined control value is forwarded to a regulator 46 which actuates the motor 8 of the flow regulator valve 6 of the bypass line 4.

Figure 2:
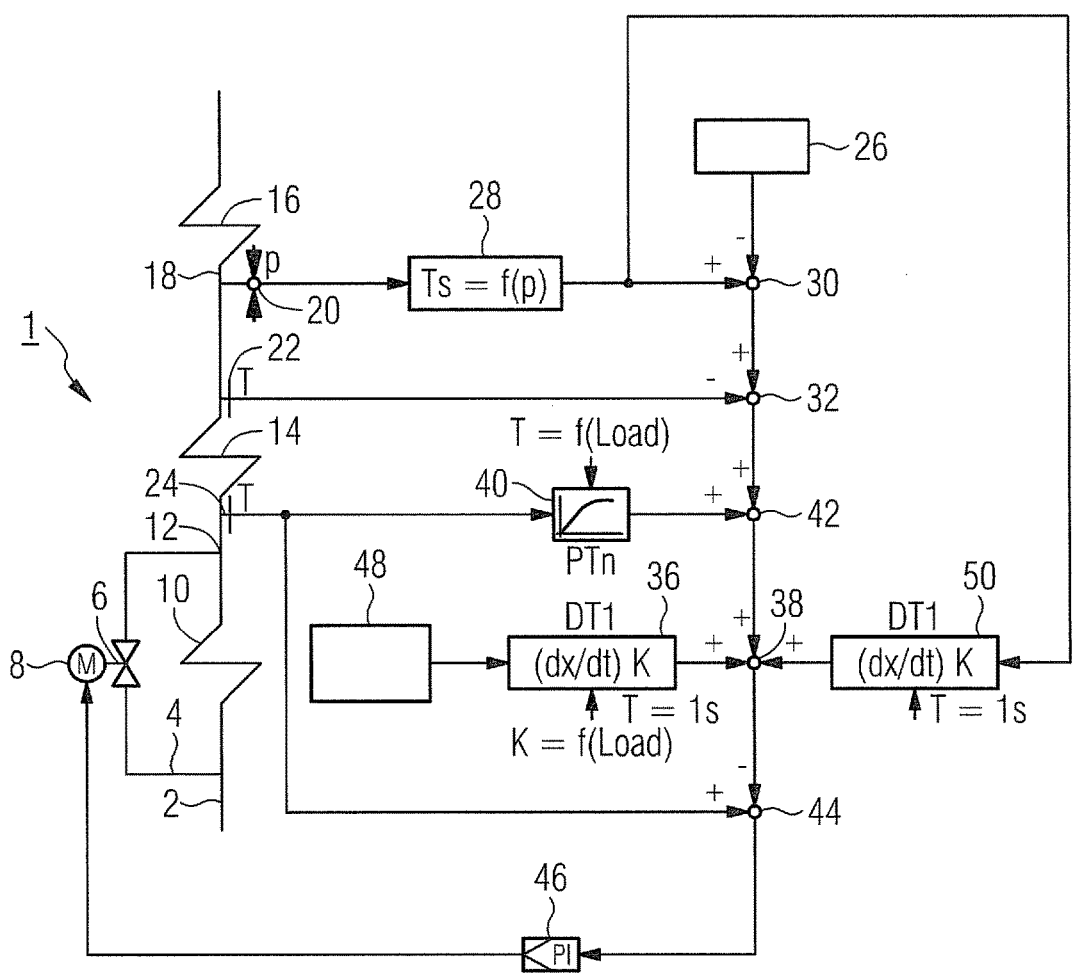
FIG. 2 is a schematic representation of the control method taking into account the balanced flue gas heat of the evaporator and the change in the saturation temperature in the evaporator.

FIG. 2 shows a schematic representation of a variant of the regulator circuit from FIG. 1. In contrast to FIG. 1, the balanced flue gas heat 48 is used here instead of the power output 34 of the gas turbine as the input signal for the DT1 element 36. The balanced flue gas heat 48 is calculated from the difference between the flue gas temperature at the evaporator inlet 18 and the flue gas temperature at the evaporator outlet (see description hereinofore) as well as from that due to the flue gas mass flow. The balanced flue gas heat 48 is therefore a more direct indicator for the thermal flow volume supplied to the waste heat steam generator 1 than the power output 34 of the upstream gas turbine. An even better regulation of the temperature at the evaporator inlet 18 is therefore possible as a result.

FIG. 2 also shows a further DT1 element 50 which generates an output signal when changes in the saturation temperature in the evaporator 16 occur. Said output signal is supplied to the regulator circuit in the adding element 38. This enables adequate supercooling at the evaporator inlet 18 to be ensured in the event of a rapid change in pressure and hence in the saturation temperature 28 in the evaporator 16 even with a stationary supply of heat to the waste heat steam generator 1.

All in all, a substantially safer and more reliable operation of the waste heat steam generator 1 is possible by means of the described control concept.

The invention claimed is:

1. A method for operating a waste heat steam generator, comprising:
   providing the waste heat steam generator with an evaporator, an economizer with a first plurality of economizer heating surfaces, and a bypass line connected in parallel with a second plurality of economizer heating surfaces on a flow medium side; and
   using a variable that is characteristic of a thermal energy supplied to the waste heat steam generator to control or regulate a flow rate through the bypass line, and
   wherein a power output of a gas turbine connected upstream of the waste heat steam generator on a flue gas side is used as the characteristic variable for the thermal energy supplied to the waste heat steam generator,
   wherein a temperature device and pressure device are provided at the inlet to the evaporator in order to respectively measure the temperature and pressure at the inlet to the evaporator, wherein the temperature device and pressure device at the evaporator inlet are used for controlling or regulating the flow rate through the bypass line, wherein a saturation temperature in the evaporator, determined from the pressure measurement at the evaporator inlet, is used for controlling or regulating the flow rate through the bypass line, and wherein as a result of the controlling or regulating the flow rate through the bypass line the temperature at the inlet to the evaporator includes a deviation from the saturation temperature.

2. The method as claimed in claim 1, wherein when the characteristic variable is increased the flow rate through the bypass line is reduced.

3. The method as claimed in claim 1, wherein when the characteristic variable is reduced the flow rate through the bypass line is increased.

4. The method as claimed in claim 1, wherein a temperature at a mixing point at an outlet of the bypass line is used for controlling or regulating the flow rate through the bypass line.

5. A waste heat steam generator having an evaporator, comprising:
an economizer with a first plurality of economizer heating surfaces;
a bypass line connected in parallel with a second plurality of economizer heating surfaces on a flow medium side;
a flow control or flow regulator valve;
a first temperature measuring device and a pressure measuring device at an evaporator inlet;
a second temperature measuring device at a mixing point at an outlet of the bypass line; and
a control device that is connected to the first temperature measuring device and; the second temperature measuring device on an input side, and connected to the flow control or flow regulator valve on an output side,
wherein the control device is embodied for performing a method, the method comprising:
using a variable that is characteristic of a thermal energy supplied to the waste heat steam generator to control or regulate a flow rate through the bypass line,
wherein a power output of a gas turbine connected upstream of the waste heat steam generator on a flue gas side is used as the characteristic variable for the thermal energy supplied to the waste heat steam generator,
wherein the first temperature device and the pressure device at the evaporator inlet are used for controlling or regulating the flow rate through the bypass line,
wherein a saturation temperature in the evaporator, determined from the pressure measurement at the evaporator inlet, is used for controlling or regulating the flow rate through the bypass line, and
wherein as a result of the controlling or regulating the flow rate through the bypass line the temperature at the inlet to the evaporator includes a deviation from the saturation temperature.

6. The steam generator as claimed in claim 5, wherein when the characteristic variable is increased the flow rate through the bypass line is reduced.

7. The steam generator as claimed in claim 5, wherein when the characteristic variable is reduced the flow rate through the bypass line is increased.

8. The steam generator as claimed in claim 5, wherein a temperature at a mixing point at an outlet of the bypass line is used for controlling or regulating the flow rate through the bypass line.

9. A gas and steam turbine system, comprising:
a waste heat steam generator, comprising:
an economizer with a first plurality of economizer heating surfaces;
a bypass line connected in parallel with a second plurality of economizer heating surfaces on the flow medium side;
a flow control or flow regulator valve;
a first temperature measuring device and pressure measuring device at an evaporator inlet;
a second temperature measuring device at a mixing point at an outlet of the bypass line; and
a control device that is connected to the first temperature measuring device, the second temperature measuring device, and the pressure measuring device on an input side, and connected to the flow control or flow regulator valve on an output other side,
wherein the control device is embodied for performing a method, the method comprising:
using a variable that is characteristic of a thermal energy supplied to the waste heat steam generator to control or regulate a flow rate through the bypass line,
wherein a power output of a gas turbine connected upstream of the waste heat steam generator on a flue gas side is used as the characteristic variable for the thermal energy supplied to the waste heat steam generator, and
wherein the first temperature device and the pressure device at the evaporator inlet are used for controlling or regulating the flow rate through the bypass line,
wherein a saturation temperature in the evaporator, determined from the pressure measurement at the evaporator inlet, is used for controlling or regulating the flow rate through the bypass line, and
wherein as a result of the controlling or regulating the flow rate through the bypass line the temperature at the inlet to the evaporator includes a deviation from the saturation temperature.

10. The turbine as claimed in claim 9, wherein when the characteristic variable is increased the flow rate through the bypass line is reduced.

11. The turbine as claimed in claim 9, wherein when the characteristic variable is reduced the flow rate through the bypass line is increased.

12. The turbine as claimed in claim 9, wherein a temperature at a mixing point at an outlet of the bypass line is used for controlling or regulating the flow rate through the bypass line.

* * * * *